HARNESS,
Saddles, Harness.

33

EXAMINERS.

Div. 11.

(72.)

2 Sheets--Sheet 1.

S. E. TOMPKINS.

Harness Saddle.

No. 4,709.

Reissued Jan. 9, 1872.

4,709.—*Saddle-Tree.*—SAMUEL E. TOMPKINS, Sing Sing, N. Y.—Patent No. 30,168, dated September 25, 1860.

*Claim.*—1. A metal frame for saddle-trees cast with depressions, level flanches, and holes or their equivalent in such flanches, or such flanches and depressions for retaining the leather portions of the saddle to the frame, substantially as described.

2. A metal frame cast with depressions, level flanches, and holes or their equivalent in such flanches or in such flanches and depressions and a seat-block, in combination with an interposed and separate piece of leather, for the purposes substantially as described.

3. A hook constructed with a shoulder, *m'*, at its rear, in combination with a jog, *n*, in the tree, substantially as described.

4. The combination of a projection on the tree for retaining the seat in position with the recesses in the under side of the said seat, in which said projection rests and serves as a support and rest for the front side of the seat.

*Fig. 1.*

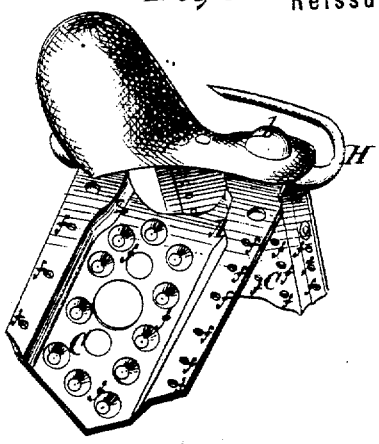

*Fig. 2.*

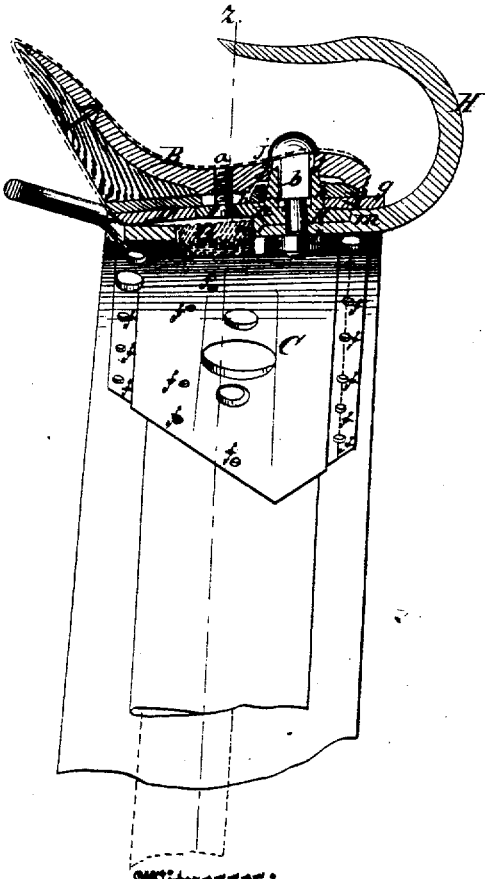

*Fig. 3.*

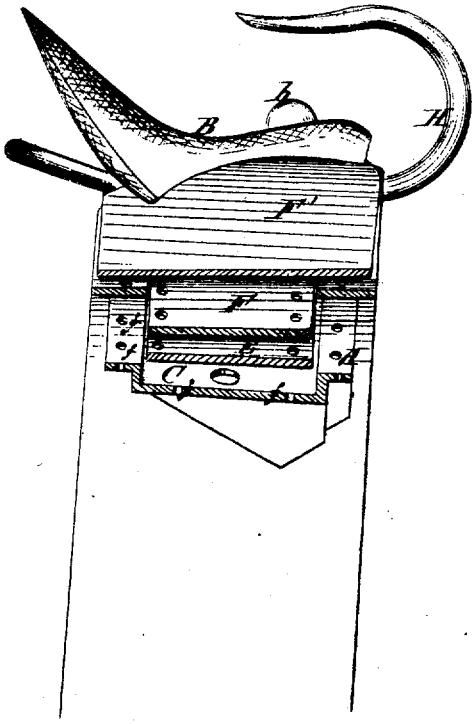

Witnesses:

A B Malcomson
Jas. W. Smith

Inventor:

Samuel E. Tompkins
by
Cochrane & Todd
his Attorneys.

A.M. PHOTO-LITHOGRAPHIC CO. N.Y. (OSBORNE'S PROCESS.)

(72.)

2 Sheets--Sheet 2.

S. E. TOMPKINS.

Harness Saddle.

No. 4,709.

Reissued Jan. 9, 1872.

Witnesses:

A B Malcomson

John Wm. Smith

Inventor:

Samuel E. Tompkins
by
Cochrane & Kidd
his Attorneys.

AM. PHOTO-LITHOGRAPHIC CO. N.Y. (OSBORNE'S PROCESS.)

UNITED STATES PATENT OFFICE.

SAMUEL E. TOMPKINS, OF SING SING, NEW YORK.

IMPROVEMENT IN SADDLE-TREES.

Specification forming part of Letters Patent No. 30,168, dated September 25, 1860; reissue No. 4,709, dated January 9, 1872.

*To all whom it may concern:*

Be it known that I, SAMUEL E. TOMPKINS, of Sing Sing, in the State of New York, have invented a new and Improved Gig Saddle-Tree; and I do hereby declare that the following is a full, clear, and exact description of the same, reference being had to the accompanying drawing making a part of this specification, in which—

Figure 4:
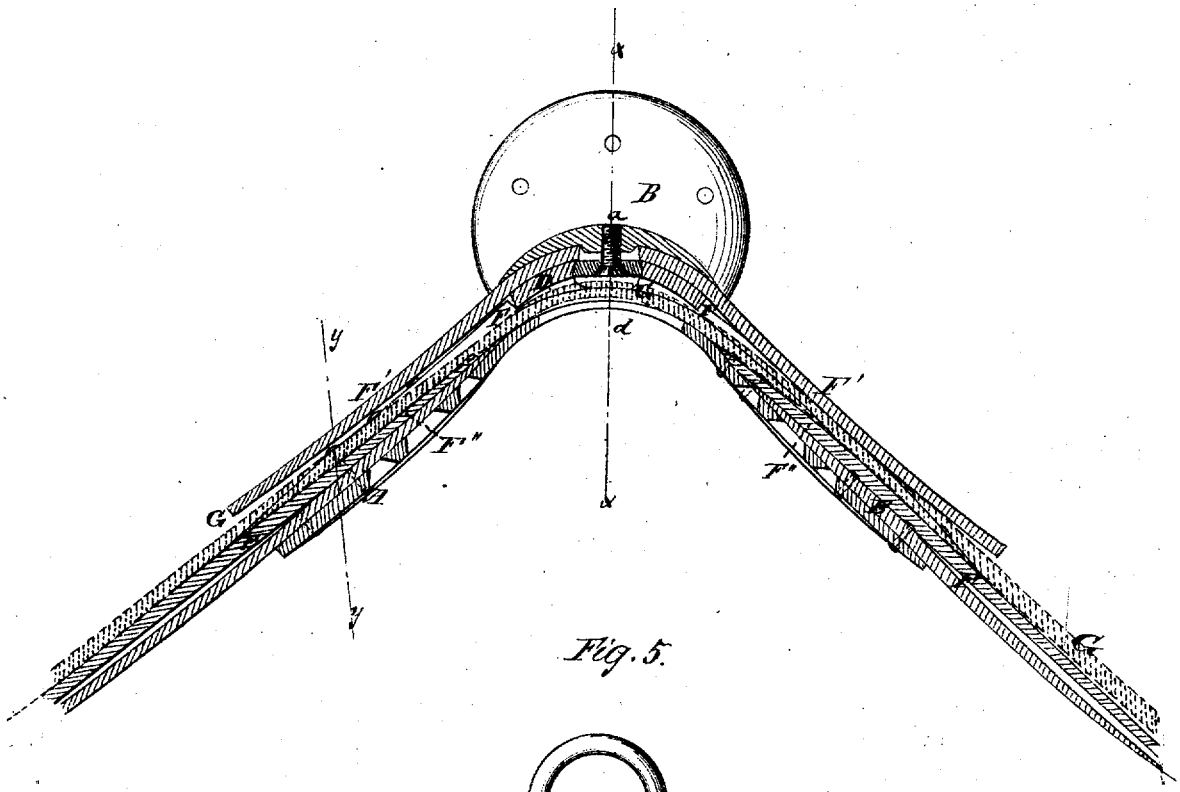
Figure 5:
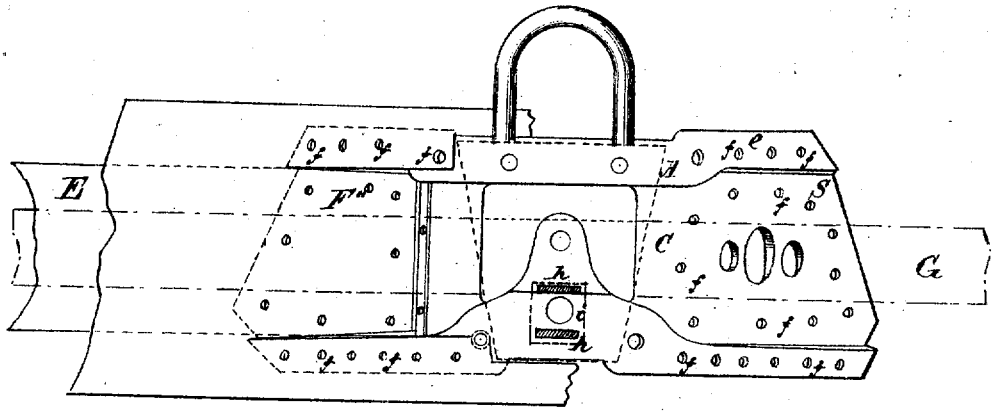

Figure 1 is a perspective view of the frame and seat which constitute the tree; Fig. 2, a vertical section of the saddle complete, *x x*, Fig. 4, indicating the plane of section; Fig. 3, a section of same taken in the line *y y*, Fig. 4; Fig. 4, a section of same taken in the line *z z*, Fig. 2; Fig. 5, a plan or top view of the frame, with a portion of the parts which compose the saddle-tree attached.

Similar letters of reference indicate corresponding parts in the several figures.

One object of these improvements is to obtain a gig saddle-tree by which a saddle may be constructed to fit properly any horse, and thereby avoid injuring or galling the back of the animal—a contingency of frequent occurrence as saddles have been previously constructed; also, the simplifying of the manufacture of gig-saddles, especially those of a superior kind, and to render the same more chaste and neat in appearance, stronger, and more durable than usual; the invention being applicable to all kinds of gig-saddles, such as silvered and japanned seats, leather jockeys, covered seats, &c., &c. Such improvements have reference to a construction of a frame of metal, in manner as hereinafter described, for carrying out the before-referred-to objects. Second, the use of an interposed piece of leather, in connection with said frame and the seat-block. Third, an improved arrangement of the check-rein hook. Fourth, an improved construction and arrangement of projection for retaining the seat in position and preventing the bolt from drawing the seat down upon said piece of leather, and thereby pressing such leather out of place. This improved tree, in common with other metallic trees, consists of two principal parts, to wit, the frame A and the seat B, secured together by means of a screw, *a*, in connection with a bolt, *b*, which secures the check-rein hook H to the tree. The filling of the seat B is composed of wood; thus at the rear of this metallic-covered seat there is no yielding, as was the case when leather or other soft substance was used, and a better construction is thereby obtained for the completion of the saddle. The binding-edge of the frame of the tree presents very nearly the appearance of an inverted V, and within this edge the frame is shaped so as to conform as nearly as possible to the shape of that part of the horse on which it bears or rests when padded. In order to secure the two forms stated, the intermediate portion of the frame is countersunk or depressed from the right and left sides of the seat down to the terminating ends of the skirting portions of the frame, the depth of the depression S gradually increasing from the sides of the seat R downward to within a short distance of the terminating ends of the skirting-plates, and then decreasing in depth until it terminates. Thus depressing the skirting portions *c c* of the frame causes a flanch or flat-surfaced rib, *e*, to be left at the front and rear edges of the skirting portions of the frame, said flanches being level on top, and serving to strengthen the frame, and also answering another important office, as will be presently described. The countersunk or depressed portions *c c* of the frame and also the flanches *e* have a number of holes, *f f*, cast in them, as shown in Figs. 1 and 5, for the passage of nails, as hereinafter described. Into the depressions of the skirting portions *c c* of the frame A stiff strips of leather, E, are placed. The leather strips E extend below the ends of the frame A, and serve to stiffen the flaps F, and they also afford, in connection with the flaps, sufficient substance to hold the nuts for the terrets. D is a piece of leather similar to the under side of the seat. It is interposed between the seat and frame. This piece of leather gives an opportunity to tack down the leather covering of the seat both at the front and rear, and it admits of the flaps F and fore pieces *g* being secured on the frame with a smooth connection, without the necessity of skiving down the gullet-piece, thereby making a much neater fit or adjustment of the parts, and leaving ample room for the back bands G and other appurtenances. The leather D also admits of the jockeys F being made independent of each other, as each jockey can be tacked to it. If desired, however, the jockeys may be formed of one piece and passed between the seat B and the leather D. By having the frame A cast with the depressions *c c* and flanches *e e*, as described, the usual "blocking" is dispensed with, as the flanches supply the place of blocking, and at the same time the recesses or grooves which are formed in the skirting portions of the frame allow the back-band G to pass through, as shown clearly in Fig. 4. The flaps F can also be nailed to the flanches *e e*, as the perforations *f f* allow for the passage of nails, and the holding-tongues F″ F″ of the flaps and the leather strips E can be nailed to the skirting portion of the frame, as the perforations *f f* allow for the passage of nails, as represented. On top of the frame A, at its front part, there are shown two upright projections, *h h*, one being at the front and the other at the back of the bolt-hole *i*. These projections form bearings for the front part of the seat B, and prevent the latter sinking, as it would do without them, on account of the leather D yielding under the "draw" of the screw and bolt. The upper ends of the projections *h h* fit in recesses *j j* in the under side of the seat, and thereby prevent the casual moving or shifting of the same in a horizontal plane, while serving as a support or rest for the front side of the seat. The upper part of the frame A, at its under side, is made flat, as shown at K, Fig. 2, in order to secure snugly the flat portion *l* of the check-rein hook H. This flat portion is provided with shoulders *m m′*, the front shoulder *m* bearing against the front edge of the frame A, and the back one, *m′*, fitting or locking behind a jog, *n*, at the under side of the frame, as shown clearly in Fig. 2. By this arrangement it will be seen that when the nut *o* of the bolt *b* is screwed up the hook H will be retained firmly in place and all forward strain taken off the nut and screws.

My frame, as constructed, must not be confounded with those frames which have been provided with recesses to admit of the back-band passing through underneath the seat. In the latter case no flanches, with holes for nails, were arranged to secure the flaps in proper place. Neither were the depressions of the skirting projection of the frame *c* perforated to admit nails for fastening stiffening-leather and flaps, as described, and no proper shape was given corresponding to the horse's back therein. In my tree there are depressions which hold the stiffeners and tongue of flap as well as the back-band; and the flanches are raised up level, avoiding thereby the necessity of blocking, which had to be resorted to in former constructions. The interposed and separate piece of leather serves as a foundation for the covering attachment thereto of the jockeys, and also affording elevation to meet the substance or thickness of the flaps.

I do not claim the interposed piece of leather as a temporary element, but as a permanent one of my combination and arrangement in the construction of my saddle-tree, thereby giving the saddler a combination and arrangement of parts with which to finish up the tree, and which are not removed in such finishing up.

What I claim as my invention, and desire to secure by Letters Patent, is—

1. A metal frame for saddle-trees cast with depressions, level flanches, and holes or their equivalent in such flanches, or such flanches and depressions for retaining the leather portions of the saddle to the frame, substantially as described.

2. A metal frame cast with depressions, level flanches, and holes or their equivalent in such flanches, or in such flanches and depressions and a seat-block, in combination with an interposed and separate piece of leather, for the purposes substantially as described.

3. A hook constructed with a shoulder, *m′*, at its rear, in combination with a jog, *n*, in the tree, substantially as described.

4. The combination of a projection on the tree for retaining the seat in position with the recesses in the under side of the said seat, in which said projection rests and serves as a support and rest for the front side of the seat.

Witnesses: SAML. E. TOMPKINS.
A. B. MALCOMSON, Jr.,
SAM. FRO. SMITH.

(72)